United States Patent
Jenkins et al.

(10) Patent No.: US 11,528,317 B1
(45) Date of Patent: Dec. 13, 2022

(54) PROXY-ENABLED COMMUNICATION ACROSS NETWORK BOUNDARIES BY SELF-REPLICATING APPLICATIONS

(71) Applicant: VMware, Inc., Palo Alto, CA (US)

(72) Inventors: Akeem Jenkins, Broomfield, CO (US); Sean Huntley, New South Wales (AU); Marc Wayne Brotherson, Boulder, CO (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/308,696

(22) Filed: May 5, 2021

(51) Int. Cl.
| | | |
|---|---|---|
| *G06F 15/16* | (2006.01) | |
| *H04L 67/02* | (2022.01) | |
| *H04L 12/46* | (2006.01) | |
| *H04L 67/1095* | (2022.01) | |
| *H04L 67/561* | (2022.01) | |

(52) U.S. Cl.
CPC .......... *H04L 67/02* (2013.01); *H04L 12/4633* (2013.01); *H04L 67/1095* (2013.01); *H04L 67/561* (2022.05)

(58) Field of Classification Search
CPC . H04L 67/02; H04L 12/4633; H04L 67/1095; H04L 67/2804; H04L 63/1433; G06F 21/577
See application file for complete search history.

(56) References Cited

U.S. PATENT DOCUMENTS

| | | | |
|---|---|---|---|
| 6,026,436 A * | 2/2000 | Hawes | G06F 40/117 709/229 |
| 7,296,293 B2 * | 11/2007 | Isenberg | H04L 63/1433 726/25 |
| 8,875,296 B2 | 10/2014 | Moore | |
| 9,426,220 B2 * | 8/2016 | Chauhan | H04L 67/1097 |
| 9,619,542 B2 * | 4/2017 | Kamath | G06F 16/27 |
| 9,800,603 B1 | 10/2017 | Sidagni | |
| 10,104,203 B2 * | 10/2018 | Hatton | H04L 67/148 |
| 10,326,655 B1 * | 6/2019 | Sait | H04L 41/0846 |
| 10,374,803 B2 * | 8/2019 | Clark | H04L 45/745 |

(Continued)

*Primary Examiner* — Ario Etienne
*Assistant Examiner* — Thorne E Waugh
(74) *Attorney, Agent, or Firm* — Patterson & Sheridan, LLP

(57) ABSTRACT

The disclosure provides an approach for cross-network communication by self-replicating applications. Embodiments include identifying, by a first instance of a self-replicating application on a first computing device having a first network connection to a parent component, a second computing device that is connected to the first computing device via a second network connection. Embodiments include self-replicating, by the first instance of the self-replicating application, across the second network connection to produce a second instance of the self-replicating application on the second computing device. Embodiments include initiating, by the first instance of the self-replicating application, a proxy tunnel on the first computing device. Embodiments include receiving, by the proxy tunnel, a first communication from the second instance of the self-replicating application via the second network connection. Embodiments include sending, by the proxy tunnel, based on the first communication, a second communication to the parent component via the first network connection.

20 Claims, 5 Drawing Sheets

(56) References Cited

U.S. PATENT DOCUMENTS

| | | | | |
|---|---|---|---|---|
| 10,841,157 | B2* | 11/2020 | Brotherson | H04L 12/4641 |
| 11,032,143 | B2* | 6/2021 | Patterson | H04L 12/2807 |
| 2004/0205153 | A1* | 10/2004 | Weisshaar | H04L 9/40 |
| | | | | 709/217 |
| 2007/0198487 | A1* | 8/2007 | Masuda | G06F 16/93 |
| 2007/0244894 | A1* | 10/2007 | St. Jacques | H04L 67/108 |
| | | | | 707/999.009 |
| 2010/0094925 | A1* | 4/2010 | St Jacques, Jr. | H04N 7/173 |
| | | | | 709/202 |
| 2010/0179987 | A1* | 7/2010 | Sebastian | H04L 69/04 |
| | | | | 709/224 |
| 2013/0311603 | A1* | 11/2013 | Wang | H04L 67/1095 |
| | | | | 709/217 |
| 2015/0103679 | A1* | 4/2015 | Tessmer | H04L 43/10 |
| | | | | 370/252 |
| 2016/0364200 | A1* | 12/2016 | Beveridge | H04L 12/4633 |

* cited by examiner

PROXY-ENABLED COMMUNICATION ACROSS NETWORK BOUNDARIES BY SELF-REPLICATING APPLICATIONS

BACKGROUND

Self-replicating applications are generally configured to instantiate new instances of themselves on a plurality of endpoints, such as virtual and/or physical computer systems in a networking environment. The goal of a self-replicating application is generally to spread to as many endpoints as possible in order to perform some operations on those endpoints. An anti-worm is an example of a self-replicating application that is configured to perform benevolent operations, such as installing patches to vulnerable software, performing scans for the purpose of detecting and preventing threats and other issues, and/or the like.

In some cases, instances of a self-replicating application attempt to spread to as many endpoints as possible in a networking environment, such as to scan for threats. However, many obstacles may exist in networking environments that limit or prevent the spread and/or communication of instances of a self-replicating application. For example, a self-replicating application may spread to a portion of a networking environment that is inaccessible by a centralized management component for the self-replicating application, and so may be unable to share results of operations performed within that portion of the networking environment with the centralized management component. Furthermore, firewalls, network boundaries, security requirements, and other aspects of networking environments may further limit the spread and communication of self-replicating applications. As such, there is a need in the art for improved techniques of enabling spread and communication of self-replicating applications in networking environments.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
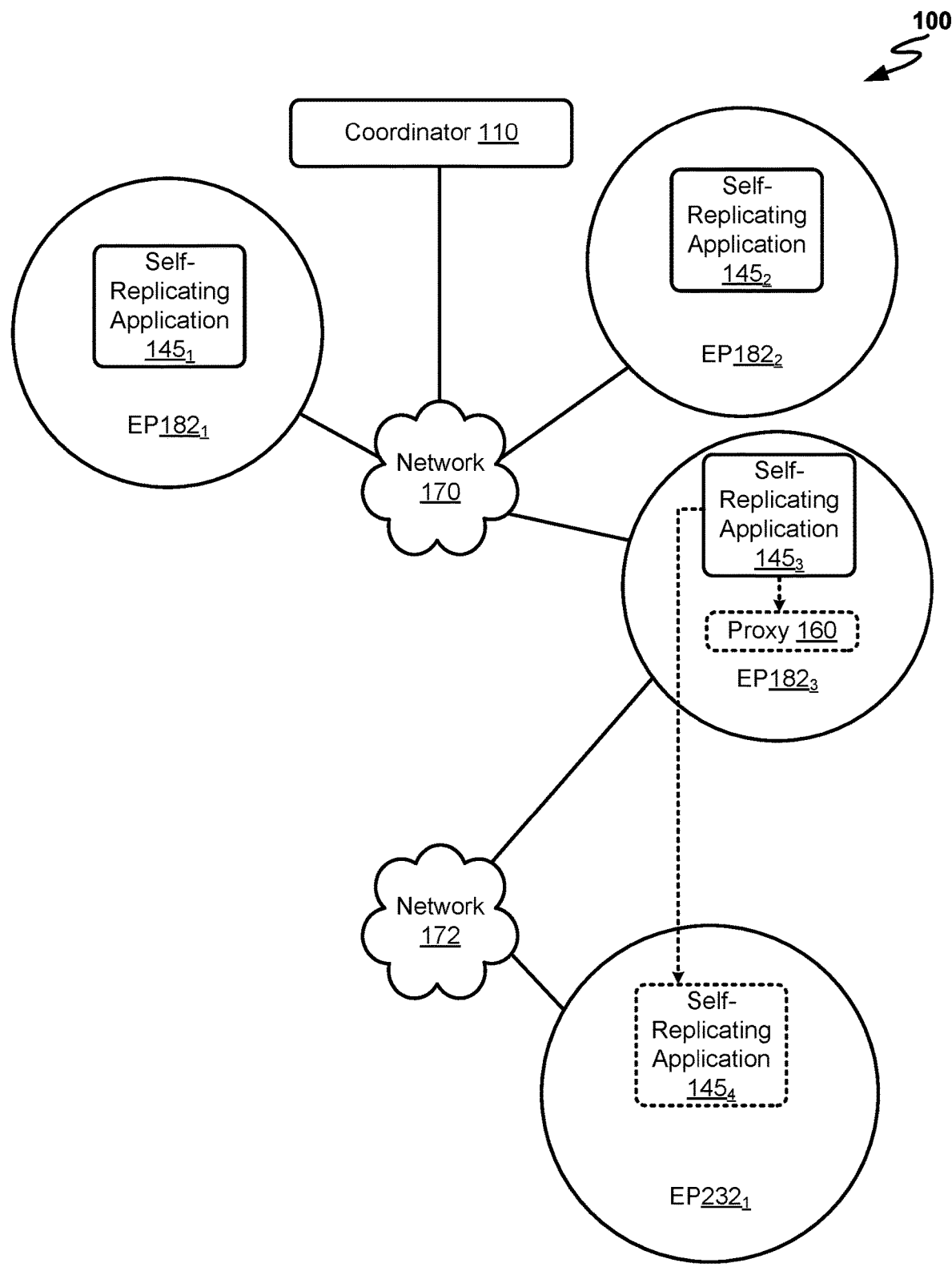
FIG. 1 depicts a block diagram of an example related to cross-network communication by self-replicating applications.

The present disclosure provides an approach for cross-network communication by self-replicating applications. In certain embodiments, a self-replicating application replicates itself to as many endpoints as it can reach (or only to endpoints that meet one or more conditions, such as having private internet protocol (IP) addresses) in order to perform operations from the endpoints, such as scanning computing devices for rogue assets. Endpoints may be computing devices, such as host computers and/or virtual computing instances (VCIs) in a data center, as described in more detail below with respect to FIG. 4. Instances of the self-replicating application may communicate results of operations performed from the various endpoints back to a centralized management component, such as a coordinator running on a server. For instance, the centralized management component may coordinate a distributed scan in which particular instances of the self-replicating application on particular endpoints are assigned particular computing devices as scanning targets and in which timing of the scans is orchestrated by the central management component. Centralized management of a distributed scan is described in more detail in U.S. patent application Ser. No. 17/223,491, the contents of which are incorporated herein by reference in their entirety.

In some embodiments, a given instance of the self-replicating application on an endpoint identifies all other endpoints that it can access from the endpoint and replicates itself onto those endpoints. In other embodiments, the self-replicating application only replicates itself to endpoints when one or more conditions are met, such as only replicating within private address space (e.g., RFC1918 IP address space), only replicating to endpoints in networking environments that meet one or more conditions, only replicating with permission from one or more users, and/or the like. Controlling application self-replication in networking environments is described in more detail in U.S. patent application Ser. No. 17/220,196, the contents of which are incorporated herein by reference in their entirety.

As described in more detail below with respect to FIG. 1, a self-replicating application may replicate itself across a network boundary (e.g., a boundary between two separate logical or physical networks). For instance, from a first endpoint in a first network that has a connection to a centralized management component, an instance of the self-replicating application may identify a connection from the first endpoint to a second endpoint in a second network, and may replicate itself across the connection to the second endpoint. The second endpoint may not have a connection to the centralized management component, as it is in a separate network. As such, embodiments of the present disclosure involve creating a proxy tunnel on the first endpoint that enables communications received from the second network to be forwarded to the centralized management component.

The proxy tunnel may be created by spawning an independent process from the instance of the self-replicating application running on the first endpoint, the independent process being configured to forward traffic received via the connection from the second endpoint (e.g., on a first port) to the centralized management component (e.g., on a second port). Information about the proxy tunnel, such as an IP address and port, may be sent to the instance of the self-replicating application on the second endpoint, and may also be forwarded on to additional endpoints within the second network to which the self-replicating application spreads. Thus, as described in more detail below with respect to FIG. 2, the proxy tunnel may enable communication from the self-replicating application within the second network to the centralized management component even if the centralized management component is not otherwise accessible from within the second network. Furthermore, as described in more detail below with respect to FIG. 3, endpoints to which the self-replicating application spreads within the second network and/or other networks reachable from within the second network, may attempt to communicate directly with the centralized management component (or another intermediary instance of the self-replicating application) prior to using the proxy tunnel in case an alternate connection becomes/is available.

In some embodiments, the proxy tunnel may perform additional operations beyond forwarding traffic in order to facilitate and/or improve the spread and/or communication of the self-replicating application. For example, the proxy tunnel may perform operations related to encryption, conversion, modification, and/or other types of actions with respect to communications to and from instances of a self-replicating application as appropriate, such as based on different network requirements or capabilities. In one example, the proxy tunnel receives a communication in a remote procedure call (RPC) protocol from an endpoint in a second network and sends the contents of the communication to the centralized management component using a hypertext transfer control protocol (HTTP) communication. Thus, the proxy tunnel further enables the self-replicating application to spread and dynamically adapt within differing networking environments.

FIG. 1 depicts a block diagram 100 of an example related to cross-network communication by self-replicating applications.

Each of networks 170 and 172 represents a physical or virtual network in which computing devices are connected to one another. For example, as described in more detail below with respect to FIG. 4, networks 170 and 172 may be software defined networking (SDN) environments, such as separate logical overlay networks. In another example, networks 170 and 172 may be different physical local area networks (LANs), different sub-nets, different domains within a single network, different data centers in a multi-site networking environment, or the like.

Endpoints $182_{1-3}$ and $232_1$ generally represent physical or virtual computing devices within networks 170 and 172. A self-replicating application 145 "replicates" (e.g., launches new instances of) itself, such as by identifying as many accessible endpoints as it can from each new endpoint on which it is launched and continuing its self-replication to the accessible endpoints as allowed based on one or more conditions.

Self-replicating application 145 may be an anti-worm or another type of self-replicating application, and may self-replicate with the intent of performing some benevolent function on as many endpoints (e.g., that meet certain conditions) as possible. In some embodiments, self-replicating application 145 scans networking environments for security vulnerabilities or rogue assets, and/or performs other types of issue detection, prevention, and/or mitigation actions. In certain embodiments, self-replicating application 145 attempts to gain access to as many endpoints as it can for the purpose of gathering data, such as for use in vulnerability detection and/or topology mapping.

After replicating to endpoint $182_2$ via network 170 (e.g., using a first secure shell (SSH) connection), self-replicating application $145_3$ on endpoint $182_3$ identifies a connection (e.g., a second SSH connection) to endpoint $232_1$ over a separate network 172. Endpoint $232_1$ is not connected to network 170, and so is not connected to endpoints $182_1$ and $182_2$ or coordinator 110. Therefore, according to techniques described herein, self-replicating application $145_3$ replicates itself over the second SSH connection to produce self-replicating application $145_4$ on endpoint $232_1$, and initiates proxy 160 on endpoint $182_3$ in order to facilitate communication between self-replicating application $145_4$ and coordinator 110. Proxy 160 may represent a separate running process from self-replicating application $145_3$ that provides a proxy tunnel across the boundary between networks 170 and 172. Information about proxy 160, such as a port and/or IP address, may be provided to self-replicating application $145_4$ so that self-replicating application $145_4$ can direct communications to proxy 160 for forwarding to coordinator 110. Furthermore, self-replicating application $145_4$ may go on to identify additional endpoints on network 172 and/or other networks that are accessible from endpoint $232_1$, and may continue to replicate to those endpoints, providing information about proxy 160 to those endpoints (and/or initiating a new proxy on endpoint $232_1$ if needed to bridge additional network boundaries).

Operation of proxy 160 is described in more detail below with respect to FIG. 2.

Figure 2:
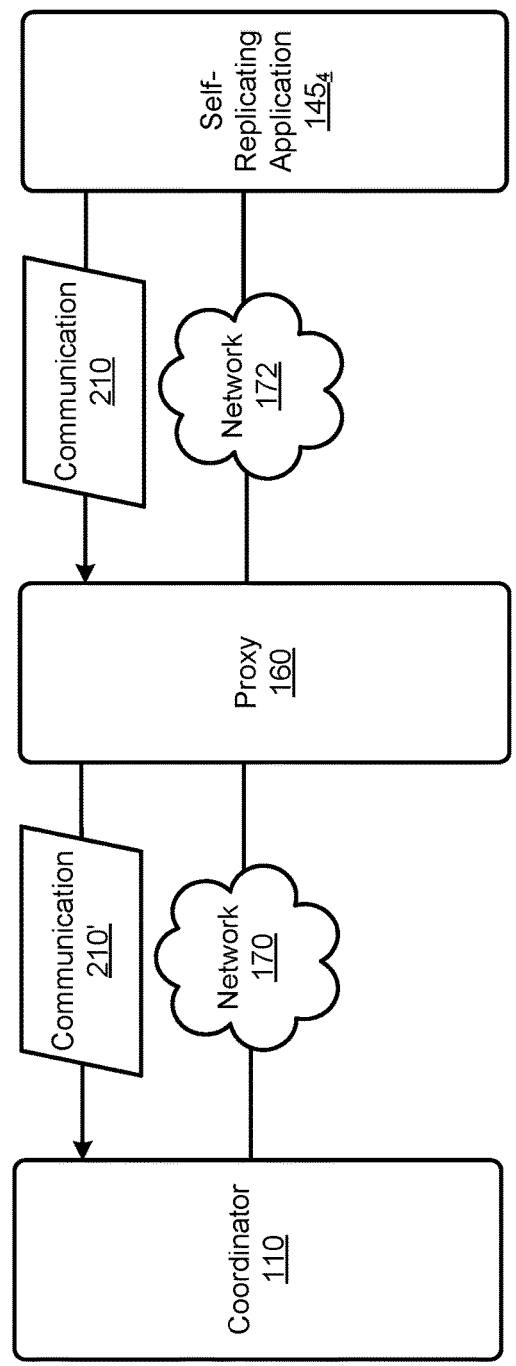
FIG. 2 depicts a block diagram of another example related to cross-network communication by self-replicating applications.

FIG. 2 depicts a block diagram 200 of another example related to cross-network communication by self-replicating applications. Block diagram 200 includes self-replicating application 145, networks 170 and 172, and proxy 160 of FIG. 1.

Self-replicating application $145_4$ sends a communication to proxy 160, such as based on information about proxy 160 provided to self-replicating application $145_4$ (e.g., IP address and port), over network 172. In some embodiments, self-replicating application $145_4$ first attempts to communicate directly with coordinator 110 (and/or other instances of self-replicating application 145 or proxies closer to coordinator 110 than proxy 160), and only sends communication 210 to proxy 160 after determining that it does not have a connection to coordinator 110 (and/or other instances of self-replicating application 145 closer to coordinator 110 than proxy 160). In certain embodiments, self-replicating application $145_4$ attempts to communicate directly with coordinator 110 (and/or other instances of self-replicating application 145 or proxies closer to coordinator 110) prior to proxy 160 being created. For instance, proxy 160 may only be created if self-replicating application $145_4$ indicates that it is unable to communicate directly with coordinator 110 (and/or other instances of self-replicating application 145 or proxies closer to coordinator 110).

Communication 210 may, for example, include information related to rogue asset detection operations performed by self-replicating application $145_4$, such as an indication of whether any rogue assets were detected on any endpoints scanned by self-replicating application $145_4$. Communication 210 may additionally or alternatively comprise a check-in message, such as including attributes of the endpoint $232_1$ of FIG. 1 on which self-replicating application $145_4$ is located. In some embodiments, communication 210 is encrypted, such as by self-replicating application $145_4$ or a separate encryption component.

Proxy 160 receives communication 210 and sends communication 210' over network 170 to coordinator 110 based on communication 210. In some embodiments, communication 210' is the same as communication 210, while in other embodiments communication 210' includes a modified version of communication 210. For instance, proxy 160 may simply forward communication 210 to coordinator 110 as communication 210' or, in some embodiments, may perform additional operations with respect to communication 210 in order to generate communication 210'. In one example, proxy 160 encrypts or decrypts communication 210 or sends communication 210 to a separate component for encryption or decryption in order to generate communication 210'. In another example, proxy 160 converts a format or protocol of communication 210, such as based on requirements or capabilities of network 170, in order to generate communication 210'. For instance, communication 210 may be an RCP communication, and proxy 160 may convert the RCP communication to an HTTP communication prior to sending communication 210'. In one example, proxy 160 may encapsulate communication 210 (e.g., with HTTP protocol information) in order to generate communication 210'. In another example, proxy 160 may change the port it uses to communicate with coordinator 110 and/or self-replicating application $145_4$ over time, such as for increased security.

In some embodiments, proxy 160 may similarly facilitate communication from coordinator 110 to self-replicating application $145_4$. For instance, information about proxy 160 may be sent to coordinator 110, and coordinator 110 may direct communications intended for self-replicating application $145_4$ to proxy 160. Proxy 160 may then send communications to self-replicating application $145_4$ based on the communications received from coordinator 110, such as in a similar way to that described with respect to block diagram 200.

Figure 3:
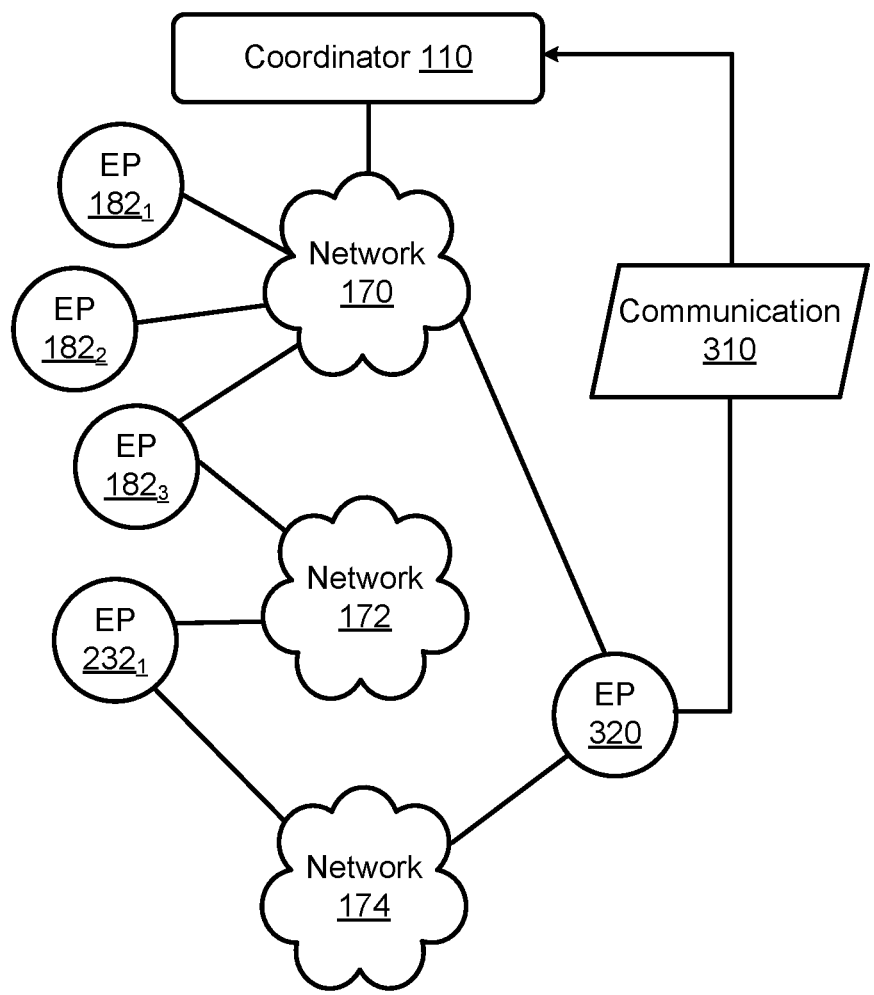
FIG. 3 depicts a block diagram of another example related to cross-network communication by self-replicating applications.

FIG. 3 depicts a block diagram 300 of another example related to cross-network communication by self-replicating applications. Block diagram 200 includes networks 170 and 172, endpoints $182_{1-3}$ and $232_1$, and coordinator 110 of FIG. 1. Furthermore, an additional endpoint 320 is connected via an additional network 174 to endpoint $232_1$.

Instances of self-replicating application 145 of FIG. 1 may run on endpoints $182_{1-3}$, $232_1$, and 320, and proxy tunnels may run on endpoints $182_3$ and $232_1$ to bridge the boundaries between network 170 and 172 and between networks 172 and 174.

When the self-replicating application spreads to endpoint 320 from endpoint $232_1$, a proxy tunnel is initiated on endpoint $232_1$ because endpoint 320 was accessed via a separate network 174 than the network 172 by which the self-replicating application spread to endpoint $232_1$. However, as shown in block diagram 200, endpoint 320 is also connected to network 170 (unknown to endpoint $232_1$). Accordingly, it would be unnecessary for the instance of the self-replicating application on endpoint 320 to utilize the proxy tunnel on endpoint $232_1$ to communicate with coordinator 110, as it can communicate directly with coordinator 110.

Thus, according to certain embodiments, a given instance of the self-replicating application may always try to communicate with coordinator 110 directly first before utilizing any proxy tunnels. In some embodiments, information about a hierarchy of instances of the self-replicating application is provided to a given instance of the self-replicating application so that the given instance of the self-replicating application can attempt to communicate with the highest hierarchical level (e.g., a location closest to coordinator 110) possible before utilizing a proxy tunnel nearest to the given instance of the self-replicating application. For example, the instance of the self-replicating application on endpoint 320 may first attempt to communicate with coordinator 110 and then with the proxy tunnel on endpoint $182_3$ before communicating with the proxy tunnel on endpoint $232_1$ (e.g., because the proxy tunnel on endpoint $182_3$ is closer to coordinator 110 than the proxy tunnel on endpoint $232_1$). For example, a hierarchy may indicate that coordinator 110 is a parent of the proxy tunnel at endpoint $182_3$, which is a parent of the proxy tunnel at endpoint $232_1$.

In the example depicted in block diagram 300, the instance of the self-replicating application on endpoint 320 first attempts to communicate with coordinator 110, and this attempt is successful due to the connection between endpoint 320 and coordinator 110 via network 170. As such, the self-replicating application on endpoint 320 sends communication 310 (e.g., including results of a scan and/or a check-in message) directly to coordinator 110 via network 170.

Thus, embodiments of the present disclosure facilitate the spread and communication of a self-replicating application throughout networking environments, including across network boundaries, while avoiding unnecessary inefficiencies in communication, such as when a more direct communication route is discovered.

It is noted that the example depicted in block diagram 300 is not limiting, and other communication arrangements are possible. For example, the instance of the self-replicating application on endpoint 320 may alternatively send communication 310 to an instance of the self-replicating application on one of endpoints $182_{1-3}$ or to a proxy tunnel associated with one of those instances of the self-replicating application. Furthermore, the self-replicating application may spread to additional endpoints in additional networks beyond network 174, and the additional instances of the self-replicating application may communicate back to coordinator 110 directly (if possible), via one or more other instances of the self-replicating application, and/or via one or more proxy tunnels. In one example, the instance of the self-replicating application in endpoint 320 receives a communication from another instance of the self-replicating application that is directed to coordinator 110 and forwards the communication to coordinator 110. In some cases, proxy tunnels may be layered n levels deep such that a first proxy tunnel forwards messages to a second proxy tunnel, and so on to an nth proxy tunnel, which forwards the messages to coordinator 110. Intermediary instances of the self-replicating application may also facilitate forwarding of messages, such as by forwarding messages to one another, to proxy tunnels, and/or to coordinator 110, as part of a communication path between an endpoint and coordinator 110.

Additionally, in some cases there may be multiple paths by which an instance of the self-replicating application or a proxy tunnel may communicate with coordinator 110. In these cases, various techniques may be utilized in order to select which path to utilize. For example, coordinator 110 may send a message to a given instance of the self-replicating application or proxy tunnel indicating which path should be chosen and/or one or more conditions by which a path is to be chosen, or the instance of the self-replicating application or proxy tunnel may make its own determination based on or more factors. In one example, numbers of network hops, security control conditions (e.g., likelihood of crossing a firewall), and/or load balancing are taken into consideration when selecting a path by which to communicate with coordinator 110, such as based on topology, latency, security control, and/or resource utilization conditions in the network. For instance, endpoints may communicate information about topology, latency, security control, and/or resource utilization to coordinator 110 and coordinator 110 may use the topology, latency, security control, and/or resource utilization information to determine which paths certain instances of the self-replicating application should use. In other embodiments, instances of the self-replicating application may share topology, latency, security control, and/or resource utilization information with one another and/or with proxy tunnels for use in selecting paths by which to communicate with coordinator 110. In one example, coordinator 110 and/or an instance of self-replicating application selects a path based on a smallest number of network hops, a lowest likelihood of crossing a security control such as a firewall, lowest amounts of resource utilization, and/or the like. It is noted that topology, latency, security control, and resource utilization information are included as examples, and other factors may alternatively or additionally be utilized when selecting communication paths.

Figure 4:
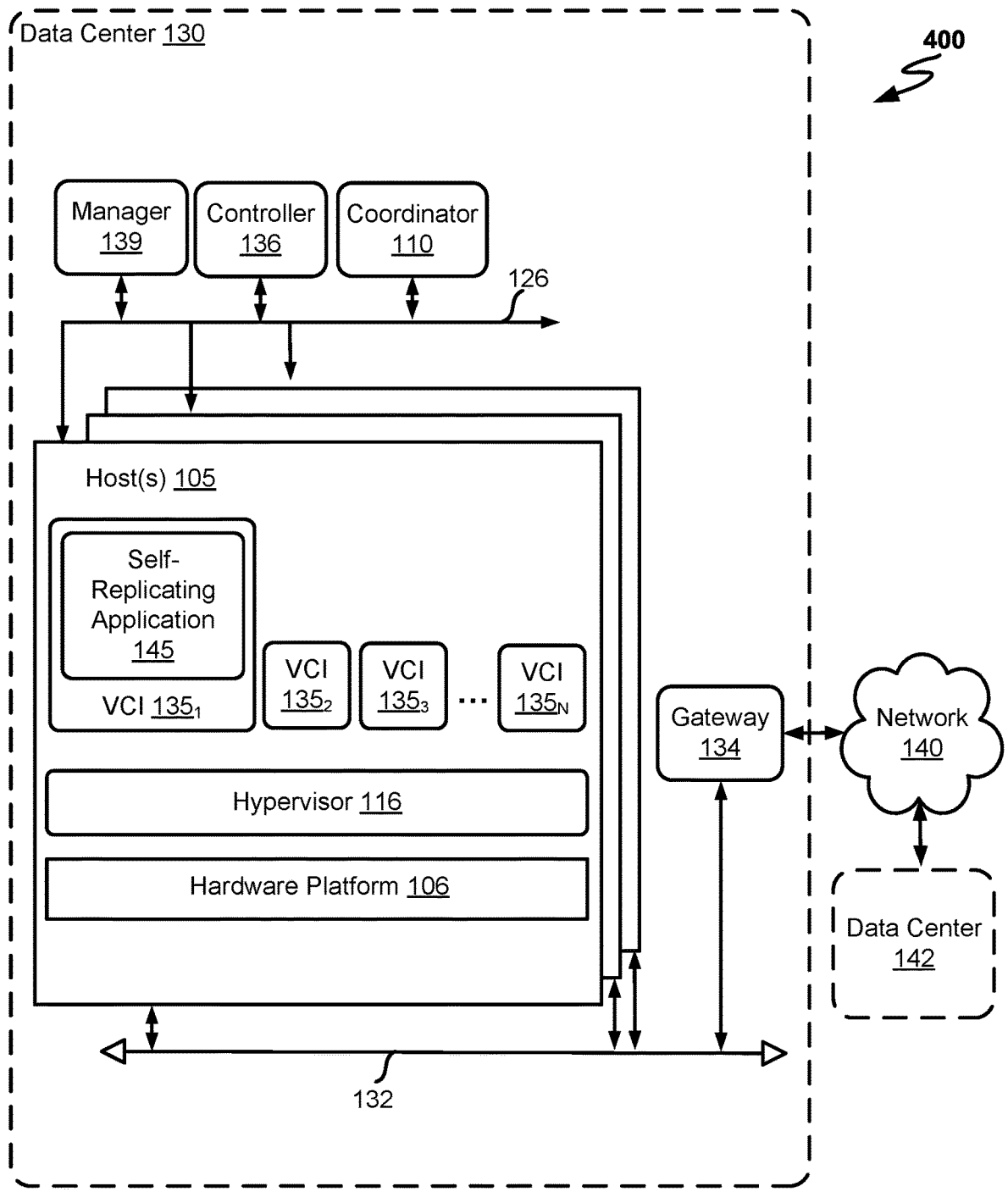
FIG. 4 depicts a block diagram of physical and virtual components of a network in which one or more embodiments of the present disclosure may be utilized.

FIG. 4 depicts a block diagram of physical and virtual components of a networking environment 400 in which one or more embodiments of the present disclosure may be utilized Networking environment 400 includes data centers 130 and 142 connected to network 140. Network 140 is generally representative of a network of computing entities such as a local area network ("LAN") or a wide area network ("WAN"), a network of networks, such as the Internet, or any connection over which data may be transmitted.

Data centers 130 and 142 each generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network. Though not shown, data center 142 may include similar components to those shown with respect to data center 130.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_N$ (collectively referred to as VCIs 135 and individually referred to as VCI 135) that run concurrently on the same host. VCIs 135 may, for example, be virtual machines (VMs), virtual appliances, containers, and/or the like. Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although aspects of the disclosure are described with reference to VMs, the teachings herein also apply to other types of VCIs or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

VCI $135_1$ includes self-replicating application 145 of FIGS. 1 and 2. For instance, self-replicating application 145 may replicate within one or more L2 networks within data centers 130 and/or 142, and L2 network boundaries may be bridged via proxy tunnels as described herein.

Gateway 134 provides VCIs 135 and other components in data center 130 with connectivity to network 140, and is used to communicate with destinations (not shown) external to data center 130. Gateway 134 may be a VCI, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or VCIs that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 139 generally represents a management plane comprising one or more computing devices responsible for receiving logical network configuration inputs, such as from a network administrator, defining one or more endpoints (e.g., VMs and/or containers) and the connections between the endpoints, as well as rules governing communications between various endpoints. In some embodiments, manager 139 communicates with hosts 105 via controller 136, which receives and transmits data to and from hosts 105 via management network 126.

Coordinator 110 generally represents a centralized management component for instances of self-replicating application 145, and may be implemented as one or more physical or virtual computing devices. In some embodiments, coordinator 110 is a VCI 135. Coordinator 110 allows the various instances of self-replicating application 145 to be centrally managed, such as for the purpose of controlling a distributed vulnerability scan or rogue asset detection. In some embodiments, coordinator 110 sends various parameters to each instance of self-replicating application 145, and each instance of self-replicating application 145 sends check-in messages to coordinator 110 upon starting and/or at regular intervals. Parameters provided by coordinator 110 to instances of self-replicating application 145 may include, for example, scanning targets for a distributed vulnerability scan (e.g., IP addresses of the entities to be scanned), scan timing information for use in determining when to perform scans of scanning targets (e.g., information indicating time windows assigned to an instance of self-replicating application 145 for performing scans), conditions related to limiting replication such as white list addresses and/or black list addresses, and/or the like.

Communication between instances of self-replicating application 145 and coordinator 110 may be facilitated by one or more proxy tunnels.

Figure 5:
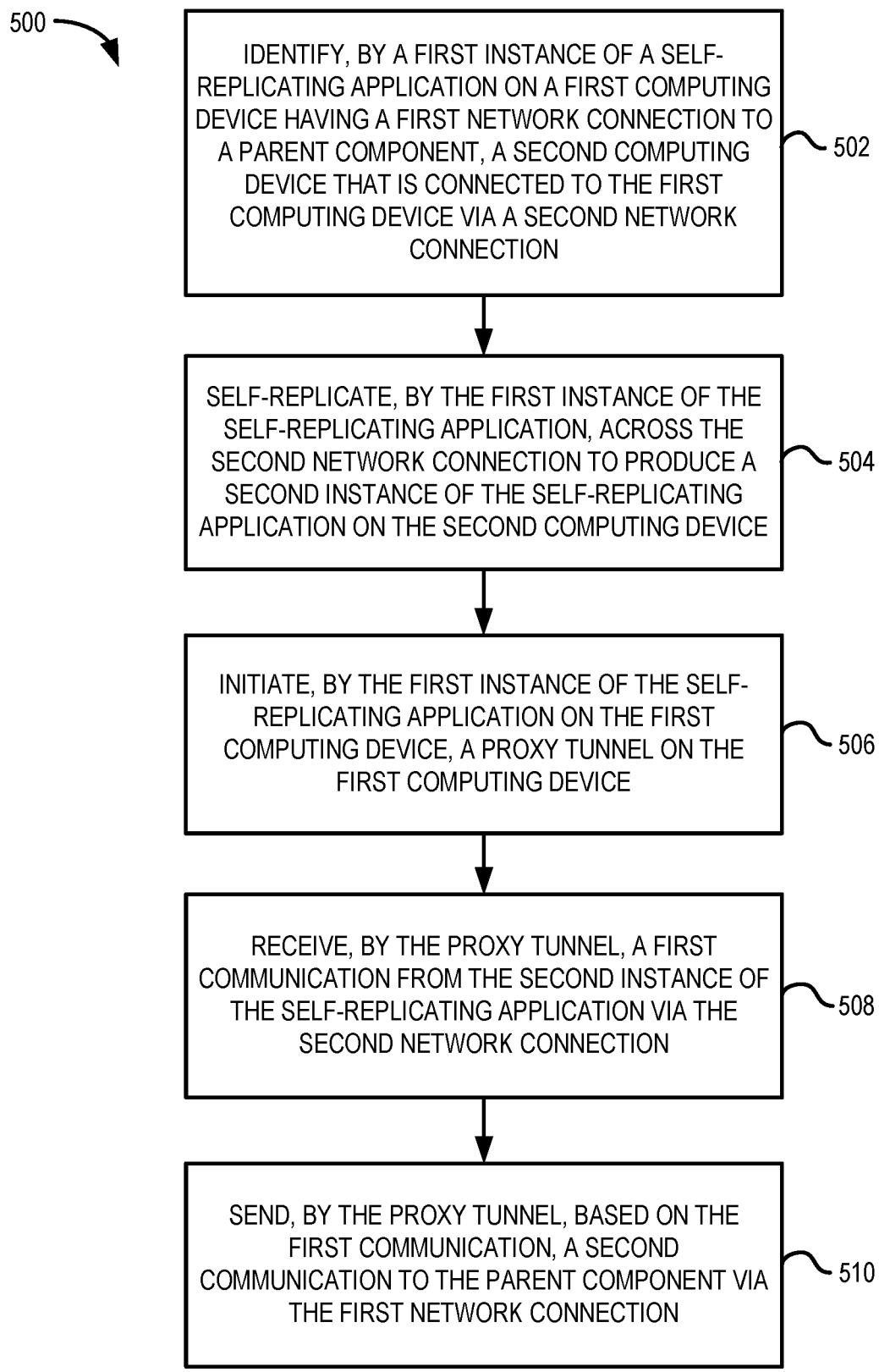
FIG. 5 depicts a flow diagram of example operations related to cross-network communication by self-replicating applications.

FIG. 5 depicts a flow diagram of operations 500 related to cross-network communication by self-replicating applications. In some embodiments, operations 500 are performed by self-replicating application 145, proxy 160, and/or coordinator 110 of FIGS. 1-4.

At step 502, a first instance of a self-replicating application on a first computing device having a first network connection to a parent component identifies a second computing device that is connected to the first computing device via a second network connection. The parent component may comprise, for example, a centralized management component for the self-replicating application, such as a coordinator. In another example, the parent component comprises an additional instance of the self-replicating application (e.g., a third instance of the self-replicating application).

At step 504, the first instance of the self-replicating application self-replicates across the second network connection to produce a second instance of the self-replicating application on the second computing device At step 506, the first instance of the self-replicating application on the first computing device initiates a proxy tunnel on the first computing device. In some embodiments, the first instance of the self-replicating application on the first computing device provides information related to the proxy tunnel, such as an IP address and port, to the second instance of the self-replicating application on the second computing device.

At step 508, the proxy tunnel receives a first communication from the second instance of the self-replicating application via the second network connection.

In some embodiments, the second instance of the self-replicating application attempts to communicate directly with the parent component (and/or with one or more other endpoints closer to the parent component than the proxy tunnel) prior to sending the first communication to the proxy tunnel, and sends the first communication to the proxy tunnel only after any other communication attempts are unsuccessful.

Certain embodiments further comprise determining, by the second instance of the self-replicating application, to send the first communication to the proxy tunnel rather than sending the first communication to an alternative endpoint based on or more of: a number of network hops; resource utilization; one or more security controls; or instructions from a centralized management component for the self-replicating application.

At step 510, the proxy tunnel sends, based on the first communication, a second communication to the parent component via the first network connection. In some embodiments, the proxy tunnel forwards the first communication to the parent component as the second communication. For example, the proxy tunnel may be configured to reflect (e.g., forward) traffic received at a first port to a second port. Other embodiments include transforming, by the proxy tunnel, the first communication based on one or more conditions related to the first network connection (e.g., requirements, capabilities, or the like) in order to produce the second communication. In one embodiment, the first communication is sent by the second instance of the self-replicating application on the second computing device using a first protocol and the second communication is sent by the proxy tunnel using a second protocol different from the first protocol.

Some embodiments further comprise determining, by the proxy tunnel, to send the second communication to the parent component rather than sending the second communication to an alternative parent component based on or more of: a number of network hops; resource utilization; one or more security controls; or instructions from a centralized management component for the self-replicating application.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of cross-network communication by self-replicating applications, comprising:
    identifying, by a first instance of a self-replicating application on a first computing device having a first network connection to a parent component, a second computing device that is connected to the first computing device via a second network connection;
    self-replicating, by the first instance of the self-replicating application, across the second network connection to produce a second instance of the self-replicating application on the second computing device;
    initiating, by the first instance of the self-replicating application on the first computing device, a proxy tunnel on the first computing device based on determining that the second network connection corresponds to a different network than the first network connection; providing, by the first instance of the self-replicating application on the first computing device, information related to the proxy tunnel to the second instance of the self-replicating application on the second computing device;
    receiving, by the proxy tunnel, a first communication from the second instance of the self-replicating application via the second network connection; and
    sending, by the proxy tunnel, based on the first communication, a second communication to the parent component via the first network connection.

2. The method of claim 1, further comprising providing, by the first instance of the self-replicating application on the first computing device, wherein the second instance of the self-replicating application uses the information related to the proxy tunnel to send the first communication.

3. The method of claim 1, wherein sending, by the proxy tunnel, based on the first communication, the second communication to the parent component via the first network connection comprises forwarding the first communication to the parent component.

4. The method of claim 1, wherein sending, by the proxy tunnel, based on the first communication, the second communication to the parent component via the first network connection comprises transforming the first communication based on one or more conditions related to the first network connection in order to produce the second communication.

5. The method of claim 1, wherein: the first communication is sent by the second instance of the self-replicating application on the second computing device using a first protocol; and the second communication is sent by the proxy tunnel using a second protocol different from the first protocol.

6. The method of claim 1, wherein the proxy tunnel is configured to forward traffic received at a first port to a second port.

7. The method of claim 1, further comprising attempting, by the second instance of the self-replicating application, to communicate directly with the parent component prior to sending the first communication to the proxy tunnel.

8. The method of claim 1, further comprising: self-replicating, by the second instance of the self-replicating application, across a third network connection to produce a third instance of the self-replicating application on a third computing device; determining, by the third instance of the self-replicating application, that the third instance of the self-replicating application is able to communicate directly with the parent component; and sending, by the third instance of the self-replicating application, a third communication directly to the parent component.

9. The method of claim 1, further comprising determining, by the second instance of the self-replicating application, to send the first communication to the proxy tunnel rather than sending the first communication to an alternative endpoint based on or more of: a number of network hops; resource utilization; one or more security controls; or instructions from a centralized management component for the self-replicating application.

10. A system for cross-network communication by self-replicating applications, comprising:
    at least one memory; and
    at least one processor coupled to the at least one memory, the at least one processor and the at least one memory configured to:
        identify, by a first instance of a self-replicating application on a first computing device having a first network connection to a parent component, a second computing device that is connected to the first computing device via a second network connection;
        self-replicate, by the first instance of the self-replicating application, across the second network connection to produce a second instance of the self-replicating application on the second computing device;

initiate, by the first instance of the self-replicating application on the first computing device, a proxy tunnel on the first computing device based on determining that the second network connection corresponds to a different network than the first network connection;

provide, by the first instance of the self-replicating application on the first computing device, information related to the proxy tunnel to the second instance of the self-replicating application on the second computing device;

receive, by the proxy tunnel, a first communication from the second instance of the self-replicating application via the second network connection; and send, by the proxy tunnel, based on the first communication, a second communication to the parent component via the first network connection.

11. The system of claim 10, wherein the second instance of the self-replicating application uses the information related to the proxy tunnel to send the first communication.

12. The system of claim 10, wherein sending, by the proxy tunnel, based on the first communication, the second communication to the parent component via the first network connection comprises forwarding the first communication to the parent component.

13. The system of claim 10, wherein sending, by the proxy tunnel, based on the first communication, the second communication to the parent component via the first network connection comprises transforming the first communication based on one or more conditions related to the first network connection in order to produce the second communication.

14. The system of claim 10, wherein:

the first communication is sent by the second instance of the self-replicating application on the second computing device using a first protocol; and the second communication is sent by the proxy tunnel using a second protocol different from the first protocol.

15. The system of claim 10, wherein the proxy tunnel is configured to forward traffic received at a first port to a second port.

16. A non-transitory computer-readable medium storing instructions that, when executed by one or more processors, cause the one or more processors to:

identify, by a first instance of a self-replicating application on a first computing device having a first network connection to a parent component, a second computing device that is connected to the first computing device via a second network connection;

self-replicate, by the first instance of the self-replicating application, across the second network connection to produce a second instance of the self-replicating application on the second computing device;

initiate, by the first instance of the self-replicating application on the first computing device, a proxy tunnel on the first computing device based on determining that the second network connection corresponds to a different network than the first network connection;

provide, by the first instance of the self-replicating application on the first computing device, information related to the proxy tunnel to the second instance of the self-replicating application on the second computing device;

receive, by the proxy tunnel, a first communication from the second instance of the self-replicating application via the second network connection; and send, by the proxy tunnel, based on the first communication, a second communication to the parent component via the first network connection.

17. The non-transitory computer-readable medium of claim 16, wherein the second instance of the self-replicating application uses the information related to the proxy tunnel to send the first communication.

18. The non-transitory computer-readable medium of claim 16, wherein sending, by the proxy tunnel, based on the first communication, the second communication to the parent component via the first network connection comprises forwarding the first communication to the parent component.

19. The non-transitory computer-readable medium of claim 16, wherein sending, by the proxy tunnel, based on the first communication, the second communication to the parent component via the first network connection comprises transforming the first communication based on one or more conditions related to the first network connection in order to produce the second communication.

20. The non-transitory computer-readable medium of claim 16, wherein:

the first communication is sent by the second instance of the self-replicating application on the second computing device using a first protocol; and the second communication is sent by the proxy tunnel using a second protocol different from the first protocol.

* * * * *